(12) United States Patent
Galla

(10) Patent No.: US 11,629,524 B2
(45) Date of Patent: Apr. 18, 2023

(54) COLLAR FOR INSTALLATION OF BARRIERS ONTO EXISTING BOLLARDS

(71) Applicant: Paul V. Galla, Erie, PA (US)

(72) Inventor: Paul V. Galla, Erie, PA (US)

( * ) Notice: Subject to any disclaimer, the term of this patent is extended or adjusted under 35 U.S.C. 154(b) by 1126 days.

(21) Appl. No.: 16/206,218

(22) Filed: Nov. 30, 2018

(65) Prior Publication Data

US 2020/0173190 A1 Jun. 4, 2020

(51) Int. Cl.
| | | |
|---|---|---|
| *E04H 17/26* | (2006.01) | |
| *E04H 17/16* | (2006.01) | |
| *E04H 17/24* | (2006.01) | |
| *E04H 17/10* | (2006.01) | |
| *F16G 11/12* | (2006.01) | |
| *E04H 17/14* | (2006.01) | |

(52) U.S. Cl.
CPC .......... *E04H 17/266* (2013.01); *E04H 17/10* (2013.01); *E04H 17/161* (2013.01); *E04H 17/24* (2013.01); *E04H 17/1473* (2021.01); *F16G 11/12* (2013.01)

(58) Field of Classification Search
CPC ....... E01F 15/00; E01F 15/003; E01F 13/022; E01F 13/024; E01F 13/026; E04H 17/10; E04H 17/124; E04H 17/161; E04H 17/17; E04H 17/266; E04H 17/1473; E04H 17/1488
See application file for complete search history.

(56) References Cited

U.S. PATENT DOCUMENTS

| | | | | |
|---|---|---|---|---|
| 1,031,622 A | * | 7/1912 | Cohrs | E04H 17/10 256/41 |
| 3,722,928 A | * | 3/1973 | Skubic | F16B 5/0685 217/43 A |
| 3,740,023 A | * | 6/1973 | Bruggeman | E04H 17/22 52/581 |
| 4,558,851 A | * | 12/1985 | Nakayama | E04H 17/04 256/73 |
| 5,040,917 A | * | 8/1991 | Camuffo | B62D 21/09 411/338 |
| 5,452,880 A | * | 9/1995 | Bailey | E04F 11/1834 256/60 |
| 5,785,447 A | * | 7/1998 | Fonti | E04H 17/1413 403/396 |
| 7,726,924 B2 | * | 6/2010 | Lu | F16B 37/068 411/553 |
| 9,228,305 B2 | * | 1/2016 | Stratford | E01F 15/00 |

(Continued)

FOREIGN PATENT DOCUMENTS

| | | | |
|---|---|---|---|
| CH | 279561 A | * | 12/1951 |
| DE | 9420528 U1 | * | 3/1995 |

(Continued)

*Primary Examiner* — Jonathan P Masinick
(74) *Attorney, Agent, or Firm* — Jonathan M. D'Silva; MMI Intellectual Property

(57) ABSTRACT

A collar assembly for retrofitting a barrier to one or more bollards comprises a barrier and at least one collar adapted to fit around each of bollard. Each collar comprises two or more openings. Each opening is configured to receive a barrier mounting device or a securing element. Each collar has at least one securing element configured to affix the collar to the one or more bollards. Each collar has at least one barrier mounting device configured to attach the barrier to the one or more bollards. The barrier is mounted to each barrier mounting device.

27 Claims, 3 Drawing Sheets

(56) References Cited

U.S. PATENT DOCUMENTS

| | | | | |
|---|---|---|---|---|
| 9,567,768 B1 * | 2/2017 | Galla | ................ | E04G 21/3266 |
| 2009/0057637 A1 * | 3/2009 | Galla | ................ | E01F 13/028 |
| | | | | 24/302 |

FOREIGN PATENT DOCUMENTS

| | | | | |
|---|---|---|---|---|
| EP | 2716841 A1 * | 4/2014 | ......... | E04H 17/1421 |
| FR | 2542356 A1 * | 9/1984 | | |
| FR | 2555639 A1 * | 5/1985 | | |
| GB | 812811 A * | 4/1959 | | |
| KR | 200327629 Y1 * | 9/2003 | | |
| KR | 200359046 Y1 * | 8/2004 | | |
| KR | 20060005293 A * | 1/2006 | | |
| KR | 100801585 B1 * | 2/2008 | | |
| KR | 100804095 B1 * | 2/2008 | | |
| KR | 100930993 B1 * | 12/2009 | | |
| KR | 100954965 B1 * | 4/2010 | | |
| KR | 20110075961 A * | 7/2011 | | |
| KR | 101113981 B1 * | 3/2012 | | |
| KR | 20140094491 A * | 7/2014 | | |
| KR | 101827876 B1 * | 2/2018 | | |
| KR | 101845008 B1 * | 4/2018 | | |
| WO | WO-8200170 A1 * | 1/1982 | | |

* cited by examiner

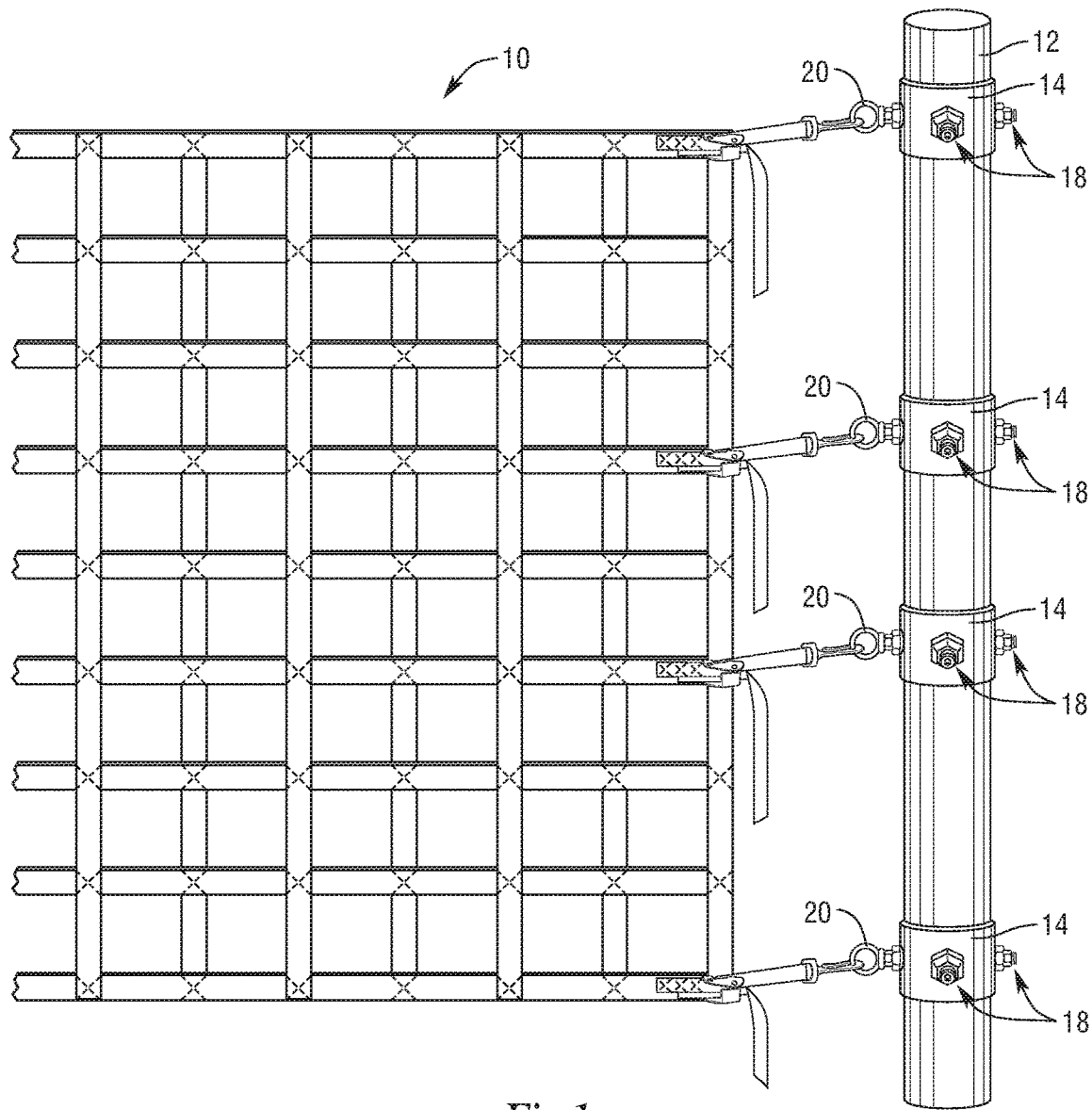
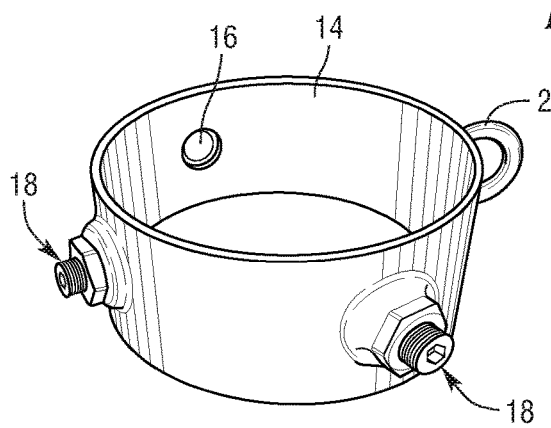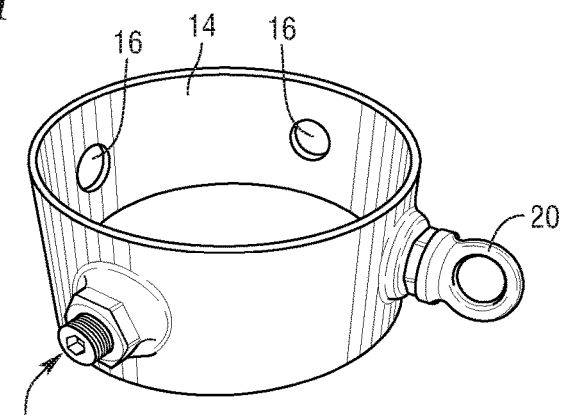
Fig.1
Fig.2  Fig.2A

COLLAR FOR INSTALLATION OF BARRIERS ONTO EXISTING BOLLARDS

BACKGROUND

Bollards have been in use for hundreds of years in various environments and for varying purposes. Maritime bollards made from used canons were used for centuries to moor ships. Today, bollards may comprise wood, metal, concrete, or plastic and may built into ships or boats for the purpose of connecting a rope for mooring or towing the vessel. Wooden bollards for traffic management appeared as early as the 18th Century. In recent times, traffic bollards may prevent large vehicles from entering an area, while simultaneously allowing passage of smaller vehicles like bicycles, as well as pedestrians. Bollards are also used at loading docks and warehouses as safety barriers to prevent or limit forklifts and trucks from damaging structures and equipment.

Aside from these uses, bollards have seen wide application in many other environments including: playgrounds, schools, trails, bicycle paths, landscaping, fire lanes, sports complexes, malls, store fronts, government buildings and facilities, intersections, vehicle parking, loading docks, traffic gates, bus stops, and toll booths.

In some cases, several bollards may traverse the perimeter of an area without any type of barrier therebetween. Normally, bollards that lack a means of attaching a barrier must be replaced with new bollards that comprise loops, eye bolts, or other similar attachment elements built into the bollard to allow attachment of a barrier. However, the expense associated with replacing such bollards may not be justified or feasible.

Some bollards may also have a means of attaching a chain, rope, barricade, gate or other type of barrier in order further prevent ingress into an area. Such bollards are typically equipped with attachment elements such as loops, eye bolts, or other similar attachment elements built into the bollard to allow attachment of a chain, rope, or other type of barrier. However, these bollards are typically limited by the type of barriers that may be attached therefrom.

A need exists therefore, for the ability to retrofit existing bollards with elements that renew and update older bollards and enable connection of walls, barricades, gates, or other types of barriers.

SUMMARY

What is presented is a collar assembly for retrofitting a barrier to one or more bollards that have a length and a width. The collar assembly comprises a barrier and at least one collar adapted to fit around each bollard. Each collar comprises two or more openings that are configured to receive a barrier mounting device or a securing element. The collars have at least one securing element configured to affix the collar to the bollards and at least one barrier mounting device configured to attach the barrier to the bollards. The barrier is mounted to each barrier mounting device.

A plurality of collars can be arranged along the length of each one or more bollards. The barrier maybe a net, a mesh, a solid barrier, or a gate. The barrier may span between multiple bollards or between one bollard and a wall. The openings may have nuts bonded, fused, soldered, or welded to the opening to aid in installation of barrier mounting devices and securing elements. The barrier mounting device may be an eye bolt, a hinge, a clip, a hook, a latch, a quick connect coupling, or a carabiner. The said securing element may be a bolt, a pin, a clamp, a screw, or a nail. The collars may be made out of steel, aluminum, plastic, or combinations thereof.

In some embodiments, the collar is a unitary piece, but it may also comprise multiple pieces held together by fasteners. The collar could also be a sleeve that extends the length of the bollard onto which it is installed. The collars may have a cross-section that is one of a square, a circle, a rectangle, or a triangle.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

FIG. 1 is a perspective view of a collar assembly comprising a plurality of collars mounted to a bollard and bearing a barrier.

FIG. 2 is a perspective view of one of the collars of FIG. 1;

FIG. 2A is a perspective view of the collar of FIG. 2;

DETAILED DESCRIPTION

Figure 3:
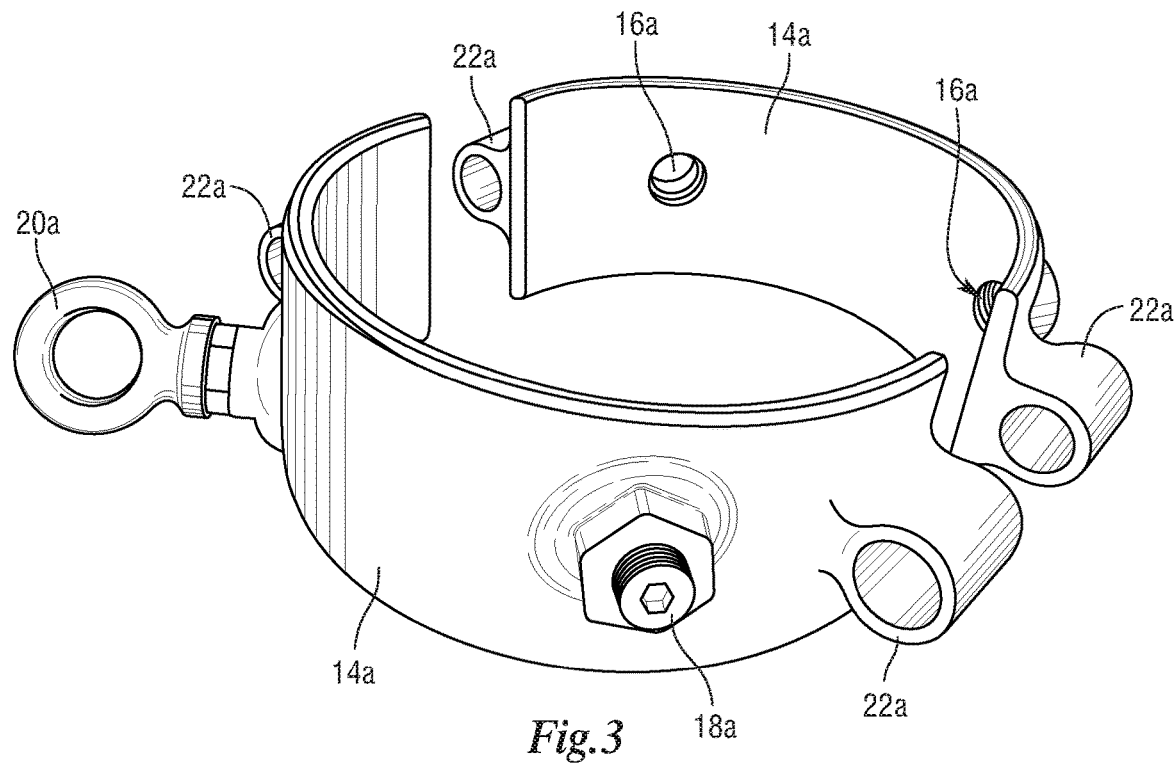
FIG. 3 is a perspective view another embodiment of a collar that comprises multiple pieces.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Bollard collars equipped with barrier attachment elements, that fit over and/or around bollards, offer a cost-effective retrofit to existing bollards that lack attachment elements and thus allow attachment of barriers such as walls, nets, gates, etc., without having to replace the original bollards.

FIG. 1 depicts a collar assembly for retrofitting a barrier 10 to one or more bollards 12. As shown, bollards 12 are short, thick posts having a vertical length and a width. Bollards 12 are typically cylindrical as shown in the figure but other cross-sectional dimensions are possible, including: round, rectangular, triangular, flower-shaped, tri-oval, hexagon, conical, or any other shape imaginable. Thus, with respect to the bollards disclosed herein, the present invention is not limited to any particular shape or dimensions. Bollards 12 themselves typically do not have any means to attach or secure barriers 10 short of tying a rope around the circumference of the bollard. FIG. 1 shows a barrier 10 retrofitted to the bollard 12 by mounting them to a plurality of collars 14. Each collar 14 is adapted to fit around each bollard 12.

As best understood by comparing FIGS. 1, 2, and 2A, each collar 14 comprising two or more openings 16. The openings 16 are configured to receive a securing element 18 or a barrier mounting device 20. The securing elements 18 are configured to affix the collar 14 to the bollards 12. The number and configuration of securing elements 18 may vary by the specific embodiment, but in general enough securing elements 18 are used to sufficiently secure the collar 14 to the bollard 12.

At least one barrier mounting device 20 is mounted to at least one of the openings 16. The barrier mounting devices 20 provide a means of attaching the barrier 10 to the bollards 12. The number and configuration of barrier mounting devices 20 may vary by the specific embodiment, but in general at least one is required to allow a barrier 10 to be mounted to a bollard 12.

In FIGS. 1, 2, and 2A, the collar 14 shown comprises four openings which in FIG. 1 have three securing elements 18 and one barrier mounting device 20 which in these embodiments is an eye bolt. However, it is understood that the type of barrier mounting device 20 could be any device that a barrier 10 may connect to such as a hinge, a clip, a hook, a latch, a quick connect coupling, a carabiner, etc.

FIG. 1 also shows that a plurality of collars 14 are arranged along the length of the bollard 12. The barrier 10 is attached to the barrier mounting device 20 of each collar 14. It is conceivable that a plurality of like barriers 10 may be strung between a series of bollards 10 in which case a single bollard 10 may be support two barriers 10 on either side. In such a configuration, each collar 14 would have two securing elements 18 with two barrier mounting devices 20. It will be understood that the combination of the number of openings 16, the number, type, configuration, and arrangement of securing elements 18 and barrier mounting devices 20 may be varied with the particular embodiment. In order to aid the mounting of securing elements 18 and barrier mounting devices 20, nuts may be bonded, fused, soldered, welded or otherwise attached to the openings 16.

The type of barrier 10 may also be varied. FIG. 1 shows a barrier 10 that is net, but other types may be used such as meshes, solid barriers, or gates. In every case, so long as the barrier mounting device 20 is capable of receiving the barrier 10, the collar 14 should be able to support the barrier 10. It is conceivable that a bollard 10 may not be adjacent to another bollard but to a wall or other surface that is generally parallel to it. In such cases, the other side of the barrier may not mount to another bollard but to the wall or other surface.

The collars 14 are typically manufactured out of materials strong enough to support the weight of the barriers 10 and in any case should be strong enough to serve the intended purpose of the barriers 10. The elements of the collar assembly may be manufactured out of steel, aluminum, plastic, or combinations thereof.

Figure 3A:
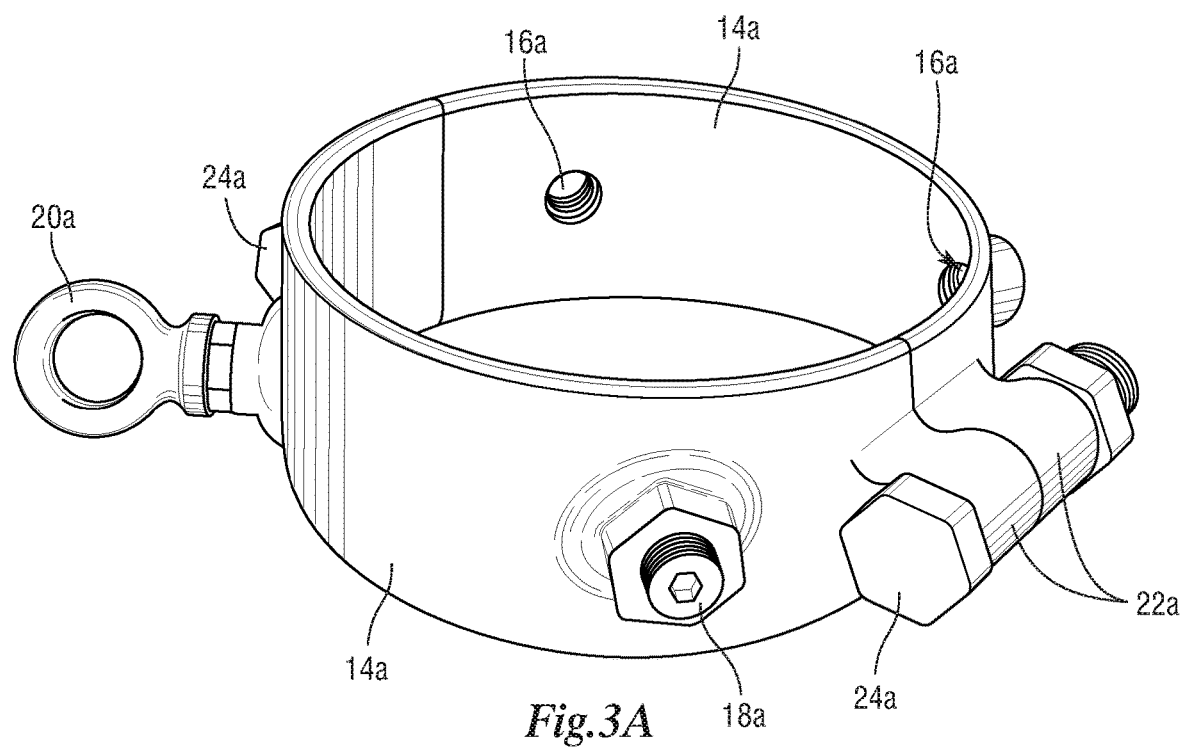
FIG. 3A is a perspective view of the collar of FIG. 3.

The collars 14 shown in FIGS. 1, 2, and 2A are unitary pieces that can slide over bollards 12 that have no obstructions on them. However, there are instances where it is impossible to install such collars 14 due to space constraints or other impediments that may be mounted to or part of the bollard 12. In such instances, the embodiment of collar 10a shown in FIGS. 3 and 3A may be helpful. The collar 10a comprises multiple pieces that may be slipped around a bollard. In this embodiment, the collar 10a comprises two halves that have bolt holes 22a which are aligned together to receive fasteners 24a that hold the two halves of the collar 10a together. The type of fastener 24a is shown to be a bolt but other types of fasteners that can securely hold the collar 10a together may be used.

This embodiment of collar 10a has the same number of openings 16a as with the earlier embodiments and depicts a barrier mounting device 20a that is an eyebolt. It will be understood that the combination of the number of openings 16a, the number, type, configuration, and arrangement of securing elements 18a and barrier mounting devices 20a may be varied by the particular embodiment. In order to aid the mounting of securing elements 18a and barrier mounting devices 20a, nuts may be bonded, fused, soldered, welded or otherwise attached to the openings 16a.

Figure 4:
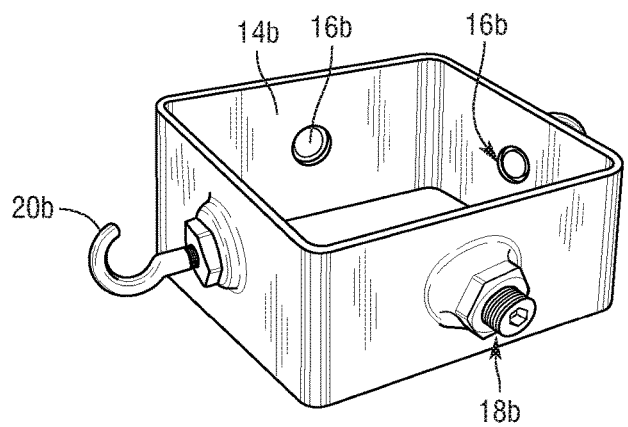
FIG. 4 is a perspective view another embodiment of a collar that has a square cross-section.

The collars shown in FIGS. 1-3A have a circular cross-section. Generally, a collar with a circular cross-section is sufficient to fit around most bollard shapes—even those bollards which themselves are not circular in cross-section. So long as the securing elements can securely mount the collar to the bollard, the shape of the collar is immaterial. However, it is possible to have collars with other cross-sectional shapes. FIG. 4 shows a collar 10b that has a square cross-section. It will be understood that other cross-sectional configurations are also possible such as rectangles, triangles, and other shapes.

This embodiment of collar 10b has the same number of openings 16b as with the earlier embodiments and depicts a barrier mounting device 20b that is a hook. It will be understood that the combination of the number of openings 16b, the number, type, configuration, and arrangement of securing elements 18b and barrier mounting devices 20b may be varied by the particular embodiment. In order to aid the mounting of securing elements 18b and barrier mounting devices 20b, nuts may be bonded, fused, soldered, welded or otherwise attached to the openings 16b.

Figure 5:
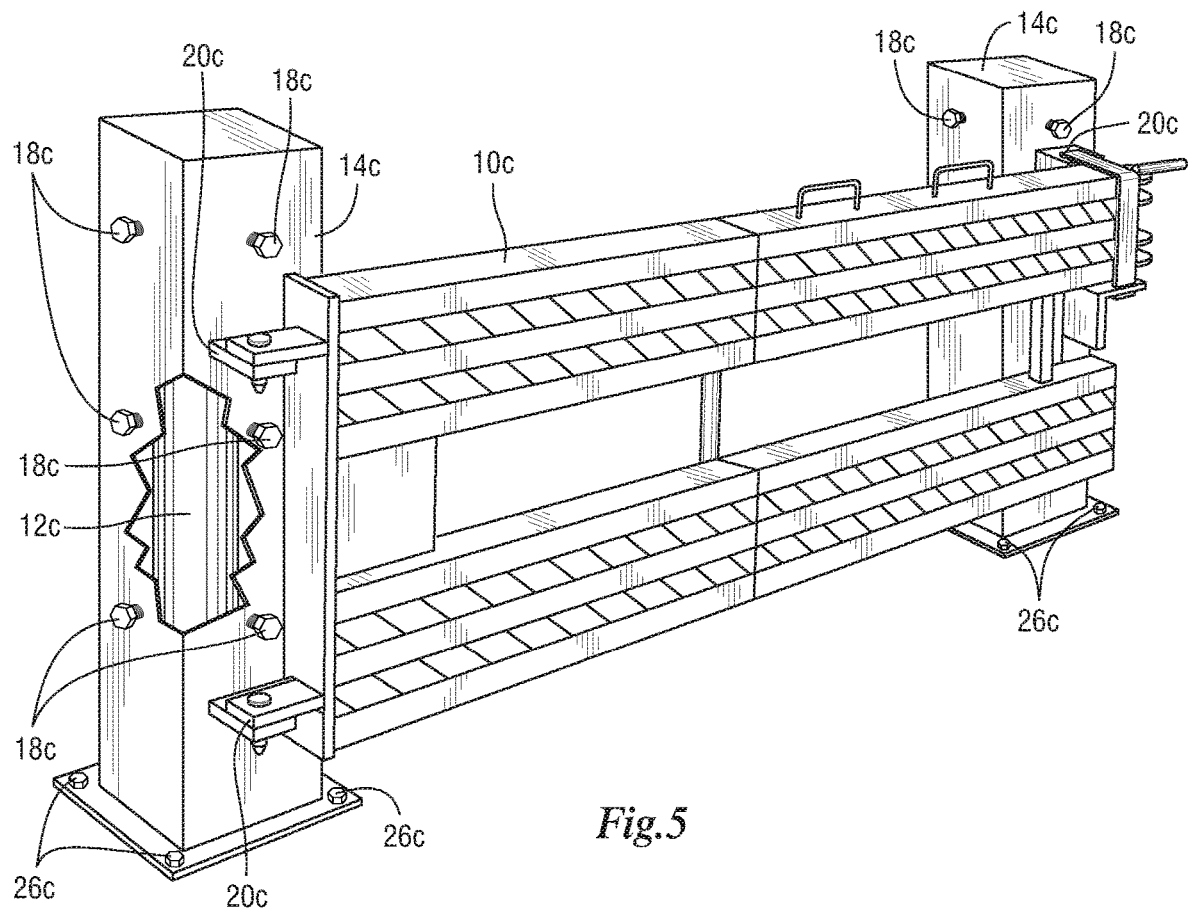
FIG. 5 is perspective view of two collars that are sleeves installed on bollards and bearing a barrier that is a gate.

The collar shown in FIGS. 1-4 are generally sized to have a length that fits its openings in a single dimension, but it will be understood that the length of the collar could be larger. In the embodiment shown in FIG. 5, the collar 14c is extended to form a sleeve that encompasses the entire bollard 12c (as can be seen in the cut-away in the drawing). This configuration allows for sturdier and heavier barriers 10c to be mounted between bollards 12c. These collars 14c may also serve as aesthetic improvements to the bollards 12c they cover. If the bollards 12c are not structurally sound, the collars 14c could also provide structural support for bollards 12c. The collars 14c could also be bolted or otherwise secured directly to the ground with bolts 26c if additional security is required.

As with earlier embodiments, securing elements 18c are installed in openings that run along the length of the collar 14c to secure each collar 14c to the bollard 12c inside it. The barrier mounting devices 20c may be sturdier than other embodiments and in FIG. 5, they comprise a hinge one collar 14c and a latch on the other. The barrier 10c in this embodiment that is mounted to the barrier mounting devices 20c is a gate that is sized to span the distance between the two adjacent bollards 12c.

It will be understood that the combination of the number of openings 16c, the number, type, configuration, and arrangement of securing elements 18c and barrier mounting devices 20c may be varied by the particular embodiment. In order to aid the mounting of securing elements 18c and barrier mounting devices 20c, nuts may be bonded, fused, soldered, welded or otherwise attached to the openings 16c.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A collar assembly for retrofitting a barrier to one or more bollards, the bollards having a length and a width, said collar assembly comprising:
   a barrier;
   at least one collar adapted to fit around each of said one or more bollards;
   each said collar comprising two or more openings, each said opening configured to receive a barrier mounting device or a securing element interchangeably;
   at least one said securing element mounted within said two or more openings to affix said collar to the one or more bollards;
   at least one said barrier mounting device mounted within said two or more openings to attach said barrier to the one or more bollards; and
   said barrier is mounted to each said barrier mounting device.

2. The collar assembly of claim 1 further comprising a plurality of said collars arranged along the length of each one or more bollards.

3. The collar assembly of claim 1 further comprising said barrier is one of a net, a mesh, a solid barrier, and a gate.

4. The collar assembly of claim 1 further comprising said barrier mounting device is one of an eye bolt, a hinge, a clip, a hook, a latch, a quick connect coupling, and a carabiner.

5. The collar assembly of claim 1 further comprising said securing element is one of a bolt, a pin, a clamp, a screw, and a nail.

6. The collar assembly of claim 1 wherein said collars comprise steel, aluminum, plastic, or combinations thereof.

7. The collar assembly of claim 1 wherein said openings comprise nuts that are bonded, fused, soldered, or welded to said opening.

8. The collar assembly of claim 1 wherein said collar is a unitary piece.

9. The collar assembly of claim 1 wherein said collar comprises multiple pieces held together by fasteners.

10. The collar assembly of claim 1 wherein said collar comprises a sleeve.

11. The collar assembly of claim 1 wherein said one or more collars has a cross-section that is one of a square, a circle, a rectangle, or a triangle.

12. The collar assembly of claim 1 in which said barrier spans between one bollard and a wall.

13. A collar assembly for retrofitting a barrier to two bollards, each bollard having a length and a width and located adjacent but apart from each other, said collar assembly comprising:
   a barrier sized to span the distance between the two bollards;
   two collars that are sleeves adapted to extend the entire length of each bollard and each said collar mounted to one of the bollards;
   each of said collars comprising a plurality of openings configured to interchangeably receive securing elements to affix said collars to each bollard and barrier mounting devices for attaching said barrier to the one or more bollards;
   at least one said securing element mounted within said two or more openings;
   each of said collars comprising at least one barrier mounting device mounted within said plurality of openings; and
   said barrier mounted to said barrier mounting devices on said collars.

14. The collar assembly of claim 13 further comprising said barrier is one of a net, a mesh, a solid barrier, and a gate.

15. The collar assembly of claim 13 further comprising said securing element is one of a bolt, a pin, a clamp, a screw, and a nail.

16. The collar assembly of claim 13 further comprising said barrier mounting device is one of an eye bolt, a hinge, a clip, a hook, a latch, a quick connect coupling, and a carabiner.

17. The collar assembly of claim 13 wherein said collars comprise steel, aluminum, plastic, or combinations thereof.

18. The collar assembly of claim 13 wherein said collars have a cross-section that is one of a square, a circle, a rectangle, or a triangle.

19. A collar for retrofitting a barrier to a bollard, the bollard having a length and a width, said collar comprising:
   said collar adapted to fit around the bollard;
   said collar comprising two or more openings, each said opening configured to receive a securing element or a barrier mounting device interchangeably;
   at least one said securing element mounted within said two or more openings to affix said collar to the bollard; and
   at least one said barrier mounting device mounted within said two or more openings to attach said barrier to the bollard.

20. The collar of claim 19 further comprising said barrier mounting device is one of an eye bolt, a hinge, a clip, a hook, a latch, a quick connect coupling, and a carabiner.

21. The collar of claim 19 further comprising said securing element is one of a bolt, a pin, a clamp, a screw, and a nail.

22. The collar of claim 19 wherein said collar comprises steel, aluminum, plastic, or combinations thereof.

23. The collar of claim 19 wherein said openings comprise nuts that are bonded, fused, soldered, or welded to said opening.

24. The collar of claim 19 wherein said collar is a unitary piece.

25. The collar of claim 19 wherein said collar multiple pieces held together by fasteners.

26. The collar of claim 19 wherein said collar comprises a sleeve.

27. The collar of claim 19 wherein said collar has a cross-section that is one of a square, a circle, a rectangle, or a triangle.

* * * * *